US012781040B2

(12) United States Patent
Kincaid et al.

(10) Patent No.: US 12,781,040 B2
(45) Date of Patent: Nov. 3, 2026

(54) THERMOSET RESIN COMPOSITIONS

(71) Applicant: Huntsman Advanced Materials Americas LLC, The Woodlands, TX (US)

(72) Inventors: Derek Kincaid, The Woodlands, TX (US); Dong Le, The Woodlands, TX (US)

(73) Assignee: HUNTSMAN ADVANCED MATERIALS AMERICAS LLC, The Woodlands, TX (US)

(*) Notice: Subject to any disclaimer, the term of this patent is extended or adjusted under 35 U.S.C. 154(b) by 551 days.

(21) Appl. No.: 18/021,039

(22) PCT Filed: Aug. 17, 2021

(86) PCT No.: PCT/US2021/046213

§ 371 (c)(1),
(2) Date: Feb. 13, 2023

(87) PCT Pub. No.: WO2022/040125

PCT Pub. Date: Feb. 24, 2022

(65) Prior Publication Data

US 2023/0303822 A1 Sep. 28, 2023

Related U.S. Application Data

(60) Provisional application No. 63/066,335, filed on Aug. 17, 2020.

(51) Int. Cl.

| | |
|---|---|
| ***C08L 63/00*** | (2006.01) |
| ***B05D 7/22*** | (2006.01) |
| ***C08J 3/28*** | (2006.01) |
| ***C08K 5/02*** | (2006.01) |
| ***C08K 5/18*** | (2006.01) |

(52) U.S. Cl.

CPC .............. *C08L 63/00* (2013.01); *B05D 7/225* (2013.01); *C08J 3/28* (2013.01); *C08K 5/02* (2013.01); *C08K 5/18* (2013.01); *C08J 2363/00* (2013.01); *C08J 2381/06* (2013.01); *C08L 2203/18* (2013.01)

(58) Field of Classification Search

None

See application file for complete search history.

(56) References Cited

U.S. PATENT DOCUMENTS 3,756,984 A 9/1973 Klaren et al.
3,856,752 A 12/1974 Bateman et al.
3,983,092 A * 9/1976 Bateman ............ C08G 59/5033 528/229
4,066,625 A 1/1978 Bolger
4,268,656 A 5/1981 Ray-Chaudhuri et al.
4,360,649 A 11/1982 Kamio et al.
4,427,802 A 1/1984 Moulton et al.
4,542,202 A 9/1985 Takeuchi et al.
4,546,155 A 10/1985 Hirose et al.
4,599,413 A 7/1986 Moulton et al.
5,134,239 A 7/1992 Bertram et al.
5,407,978 A 4/1995 Bymark et al.
5,430,112 A 7/1995 Sakata et al.
5,439,977 A 8/1995 Yokota et al.
5,464,910 A 11/1995 Nakatsuka et al.
5,476,748 A 12/1995 Steinmann et al.
5,543,486 A 8/1996 Abe et al.
5,548,058 A 8/1996 Muroi et al.
5,717,011 A 2/1998 Griggs et al.
5,733,954 A 3/1998 McKenzie et al.
5,789,498 A 8/1998 Ohnishi et al.
5,798,399 A 8/1998 Griggs et al.
5,801,218 A 9/1998 McKenzie et al.
2007/0036982 A1 2/2007 Perez et al.
2008/0090678 A1 4/2008 Kim et al.
2010/0280151 A1 11/2010 Nguyen et al.
2015/0240042 A1* 8/2015 Nguyen .................. C08J 5/248 523/400
2017/0362395 A1 12/2017 Inoubli et al.
2019/0127514 A1* 5/2019 Meegan ............... C08G 59/188
2020/0123310 A1 4/2020 Kincaid et al.

FOREIGN PATENT DOCUMENTS

CN 108367512 A 8/2018
JP H11-269428 A 10/1999
KR 2013-0118302 A 9/2011
WO 2016/102411 A1 6/2016
WO 2016/102658 A1 6/2016
WO 2016/102666 A1 6/2016
WO 2016/102682 A1 6/2016
WO 2017/106550 A1 6/2017
WO 2017/211889 A1 12/2017
WO 2017/220793 A1 12/2017
WO 2018/002259 A1 1/2018
WO WO-2018195192 A1 * 10/2018 ................ C08J 5/04
WO 2019/012052 A1 7/2019

OTHER PUBLICATIONS

Chinese office action issued May 15, 2026 in corresponding Chinese Application No. 202180050393.5 filed Feb. 16, 2023 (machine translation).
Indian office action issued Jun. 12, 2026 in corresponding Indian Application No. 202317006725 filed Feb. 13, 2023.

* cited by examiner

*Primary Examiner* — Katarzyna I Kolb
(74) *Attorney, Agent, or Firm* — Huntsman Advance

(57) ABSTRACT

The present disclosure provides a curable resin composition including a thermoset resin, a toughener component containing a multistage polymer and a thermoplastic toughener and a phenylindane diamine hardener. The curable resin composition may be used in various applications, such as a coating for industrial, automotive and electronic applications, and especially those subjected to high temperature service conditions.

16 Claims, No Drawings

THERMOSET RESIN COMPOSITIONS

CROSS-REFERENCE TO RELATED APPLICATIONS

This application is the National Phase of International Application No. PCT/US2021/046213 filed Aug. 17, 2021, which designates the United States and claims priority to U.S. Provisional Application No. 63/066,335 filed on Aug. 17, 2020. The noted applications are incorporated herein by reference in their entirety.

FIELD

The present disclosure generally relates to curable resin compositions having a high glass transition temperature, enhanced toughness resistance and superior thermal oxidative resistance and hydrolytic resistance properties. The curable resin composition is especially suited for use as a coating for industrial, automotive and electronic applications, and especially those involving high temperature service conditions.

BACKGROUND

Thermoset materials, such as cured epoxy resins, are known for their thermal and chemical resistance. They also display good mechanical properties, but frequently lack toughness and tend to be very brittle. This is especially true as their crosslink density increases or the monomer functionality increases above two. Attempts have been made to strengthen or toughen epoxy resins and other thermoset materials, such as bismaleimide resins, benzoxazine resins, cyanate ester resins, epoxy vinyl ester resins and unsaturated polyester resins, by incorporating therein a variety of toughener materials.

Such tougheners may be compared to one other by their structural, morphological, or thermal properties. The structural backbone of the toughener may be aromatic, aliphatic, or both aromatic and aliphatic. Aromatic tougheners, such as polyether ether ketone or polyimides, provide thermoset materials which exhibit reasonable improvements in toughening, namely compression after impact and, because of the aromatic structure of the toughener, low moisture uptake when subjected to hot-wet environments. Conversely, aliphatic tougheners, such as nylon (a.k.a. polyamide), provide thermoset materials which exhibit a significant improvement in compression after impact but higher than desired moisture uptake when subjected to hot-wet environments which can lead to a diminishment in compression strength and compression modulus. Other tougheners, such as core-shell polymers, can provide thermoset materials which exhibit good damage resistance. However, these tougheners tend to negatively affect the processability and glass transition temperature of the thermoset material.

One particular toughener which has found use recently in thermoset resin compositions is a multistage polymer, such as those described in WO2016102666, WO2016102658, WO2016102682, WO2017211889, WO2017220793, WO2018002259 and WO2019012052. While these tougheners have been found to be easily dispersed in the thermoset matrix to provide a homogeneous distribution, the cured products can still lack adequate toughness and chemical properties.

Therefore, a need exists to further improve upon the state of the art by utilizing a toughener components and hardeners with thermoset materials that, upon curing, allows the cured product to exhibit a high glass transition temperature and display mechanical and chemical properties that are especially suitable for use as coatings for various substrates exposed to harsh operating conditions.

SUMMARY

The present disclosure generally provides a curable resin composition including (a) a thermoset resin, (b) a toughener component comprising a multistage polymer and a thermoplastic toughener, and (c) a phenylindane diamine hardener. The curable resin composition may be used in a variety of applications including those which require the composition to exhibit, upon rapid curing, a glass transition temperature of at least 150° C., improved toughness and high thermal oxidative and hydrolytic resistance properties. Thus, the curable resin composition is especially suitable for use as a coating in industrial piping (for e.g. chemical and gas and oil industries), construction applications and in electronic devices or other commercial applications.

DETAILED DESCRIPTION

The present disclosure generally provides a curable resin composition comprising (a) a thermoset resin, (b) a toughener component comprising a multistage polymer and a thermoplastic toughener, and (c) a phenylindane diamine hardener. It has been unexpectedly found that the combination of the multistage polymer and the thermoplastic toughener along with a phenylindane diamine hardener act synergistically so that the toughening effect observed is greater than what would be expected along as well as producing a cured coating that exhibits superior thermal oxidative resistance and hydrolytic resistance properties. The curable resin compositions described hereunder demonstrate high thermal resistance properties in both aqueous and dry environments which are necessary for advanced high temperature applications. The coatings obtained from curing the curable resin compositions also exhibit a glass transition temperature Tg>150° C. and preferably Tg>170° C. and most preferably Tg>190° C.

The following terms shall have the following meanings:

The term “cure”, “cured” or similar terms, “curing” or “cure” refers to the hardening of a thermoset resin by chemical cross-linking. The term “curable” means that the composition is capable of being subjected to conditions which will render the composition to a cured or thermoset state or condition.

The term “multistage polymer” refers to a polymer formed in sequential fashion by a multistage polymerization process. The multistage polymerization process may be a multistage emulsion polymerization process in which a first polymer is a first stage polymer and the second polymer is a second stage polymer (i.e., the second polymer is formed by emulsion polymerization in the presence of the first emulsion polymer).

The term “(meth)acrylic polymer” denotes that the (meth) acrylic polymer comprises essentially polymers comprising (meth)acrylic monomers that make up 50 wt. % or more of the (meth)acrylic polymer.

The term “comprising” and derivatives thereof are not intended to exclude the presence of any additional component, step or procedure, whether or not the same is disclosed herein. In order to avoid any doubt, all compositions claimed herein through use of the term “comprising” may include any additional additive or compound, unless stated to the contrary. In contrast, the term, “consisting essentially of” if appearing herein, excludes from the scope of any succeeding recitation any other component, step or procedure, excepting those that are not essential to operability and the term "consisting of", if used, excludes any component, step or procedure not specifically delineated or listed. The term "or", unless stated otherwise, refers to the listed members individually as well as in any combination.

The articles "a" and "an" are used herein to refer to one or more than one (i.e. to at least one) of the grammatical object of the article. By way of example, "an epoxy resin" means one epoxy resin or more than one epoxy resin.

The phrases "in one embodiment", "according to one embodiment" and the like generally mean the particular feature, structure, or characteristic following the phrase is included in at least one aspect of the present disclosure, and may be included in more than one embodiment of the present disclosure. Importantly, such phases do not necessarily refer to the same embodiment.

If the specification states a component or feature "may", "can", "could", or "might" be included or have a characteristic, that particular component or feature is not required to be included or have the characteristic.

The term "about" as used herein can allow for a degree of variability in a value or range, for example, it may be within 10%, within 5%, or within 1% of a stated value or of a stated limit of a range.

Values expressed in a range format should be interpreted in a flexible manner to include not only the numerical values explicitly recited as the limits of the range, but to also include all of the individual numerical values or sub-ranges encompassed within that range as if each numerical value and sub-range is explicitly recited. For example, a range such as from 1 to 6, should be considered to have specifically disclosed sub-ranges, such as, from 1 to 3, from 2 to 4, from 3 to 6, etc., as well as individual numbers within that range, for example, 1, 2, 3, 4, 5, and 6. This applies regardless of the breadth of the range.

The terms "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

According to a first embodiment, the present disclosure provides a curable resin composition that generally includes (a) a thermoset resin, (b) a toughener component comprising a multistage polymer and a thermoplastic toughener, and (c) a phenylindane diamine hardener.

In one embodiment, the thermoset resin may be an epoxy resin, a bismaleimide resin, a benzoxazine resin, a cyanate ester resin, a phenolic resin, a vinyl ester resin or a mixture thereof. In one particular embodiment, the thermoset resin is an epoxy resin.

In general, any epoxy-containing compound is suitable for use as the epoxy resin in the present disclosure, such as the epoxy-containing compounds disclosed in U.S. Pat. No. 5,476,748 which is incorporated herein by reference. According to one embodiment, the epoxy resin is selected from a monofunctional epoxy resin, a difunctional epoxy resin (thus having two epoxide groups), a trifunctional epoxy resin (thus having three epoxide groups), a tetrafunctional epoxy resin (thus having four epoxide groups) and a mixture thereof.

Illustrative non-limiting examples of monofunctional epoxy resins are: styrene oxide, cyclohexene oxide and the glycidyl ethers of phenol, the cresols, tertbutylphenol and other alkyl phenols, butanol, 2-ethyl-hexanol and C8 to C14 alcohols and the like:

Illustrative non-limiting examples of difunctional epoxy resins are: bisphenol A diglycidyl ether, bisphenol F diglycidyl ether, tetrabromobisphenol A diglycidyl ether, propylene glycol diglycidyl ether, butylene glycol diglycidyl ether, ethylene glycol diglycidyl ether, neopentyl glycol diglycidyl ether, 1,4-butanediol diglycidyl ether, 1,6-hexanediol diglycidyl ether, cyclohexanedimethanol diglycidyl ether, polyethylene glycol diglycidyl ether, polypropylene glycol diglycidyl ether, polytetramethylene glycol diglycidyl ether, resorcinol diglycidyl ether, neopentyl glycol diglycidyl ether, bisphenol A polyethylene glycol diglycidyl ether, bisphenol A polypropylene glycol diglycidyl ether, 3,4-epoxycyclohexylmethyl carboxylate, hexahydrophthalic acid diglycidyl ester, methyltetrahydrophthalic acid diglycidyl ester and mixtures thereof. In some embodiments, the difunctional epoxy resin may be modified with a monofunctional reactive diluent, such as, but not limited to, p-tertiary butyl phenol glycidyl ether, cresyl glycidyl ether, 2-ethylhexyl glycidyl ether, and $C_8$-$C_{14}$ glycidyl ether.

Illustrative non-limiting examples of trifunctional epoxy resins are: triglycidyl ether of para-aminophenol, triglycidyl ether of meta-aminophenol, dicyclopentadiene based epoxy resins, N,N,O-triglycidyl-4-amino-m- or -5-amino-o-cresol type epoxy resins, and a 1,1,1-(triglycidyloxyphenyl)methane type epoxy resin.

Illustrative non-limiting examples of tetrafunctional epoxy resins are: N,N,N',N'-tetraglycidyl methylene dianiline, N,N,N',N'-tetraglycidyl-m-xylenediamine, tetraglycidyl diaminodiphenyl methane, sorbitol polyglycidyl ether, pentaerythritol tetraglycidyl ether, tetraglycidyl bisamino methyl cyclohexane and tetraglycidyl glycoluril.

Examples of commercially available epoxy resins which may be used include, but are not limited to, ARALDITE® PY 306 epoxy resin (an unmodified bisphenol-F based liquid epoxy resin), ARALDITE® MY 721 epoxy resin (a tetrafunctional epoxy resin based on methylene dianiline), ARALDITE® MY 0510 epoxy resin (a trifunctional epoxy resin based on para-aminophenol), ARALDITE® GY 6005 epoxy resin (a bisphenol-A based liquid epoxy resin modified with a monofunctional reactive diluent), ARALDITE® 6010 epoxy resin (a bisphenol-A based liquid epoxy resin), ARALDITE® MY 06010 epoxy resin (a trifunctional epoxy resin based on meta-aminophenol), ARALDITE® GY 285 epoxy resin (an unmodified bisphenol-F based liquid epoxy resin), ARALDITE® EPN 1138, 1139 and 1180 epoxy resins (epoxy phenol novolac resins), ARALDITE® ECN 1273 and 9611 epoxy resins (epoxy cresol novolac resins), ARALDITE® GY 289 epoxy resin (an epoxy phenol novolac resin), ARALDITE® PY 307-1 epoxy resin (an epoxy phenol novolac resin) and mixtures thereof.

In one embodiment, the amount of the epoxy resin present in the curable resin composition may be an amount of between about 10 wt. % to about 95 wt. %, or between about 20 wt. % to about 75 wt. %, or between about 30 wt. % to about 60 wt. %, or between about 40 wt. % to about 50 wt. %, based on the total weight of the curable resin composition. In another embodiment, the amount of the epoxy resin present in the curable resin composition may be an amount of between about 50 wt. % to about 95 wt. %, or between about 65 wt. % to about 90 wt. %, based on the total weight of the curable resin composition.

In yet another embodiment, the epoxy resin may be comprised of at least one trifunctional epoxy resin or tetrafunctional epoxy resin or mixture thereof and optionally at least one difunctional epoxy resin. In such embodiments, the trifunctional epoxy resin may be present in the curable resin composition in an amount of between about 25 wt. % to about 50 wt. %, or between about 35 wt. % to 45 wt. %, based on the total weight of the curable resin composition and the tetrafunctional epoxy resin may be present in the curable resin composition in an amount of between about 1 wt. % to 20 wt. %, or between about 5 wt. % to about 15 wt. % based on the total weight of the curable resin composition.

According to another embodiment, the thermoset resin is a benzoxazine resin. The benzoxazine resin may be any curable monomer, oligomer or polymer containing at least one benzoxazine moiety. Thus, in one embodiment, the benzoxazine may be represented by the general formula (1)

(1)

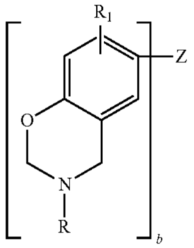

where b is an integer from 1 to 4; each R is independently hydrogen, a substituted or unsubstituted $C_1$-$C_{20}$ alkyl group, a substituted or unsubstituted $C_2$-$C_{20}$ alkenyl group, a substituted or unsubstituted $C_6$-$C_{20}$ aryl group, a substituted or unsubstituted $C_2$-$C_{20}$ heteroaryl group, a substituted or unsubstituted $C_4$-$C_{20}$ carbocyclic group, a substituted or unsubstituted $C_2$-$C_{20}$ heterocyclic group, or a $C_3$-$C_8$ cycloalkyl group; each $R_1$ is independently hydrogen, a $C_1$-$C_{20}$ alkyl group, a $C_2$-$C_{20}$ alkenyl group, or a $C_6$-$C_{20}$ aryl group; and Z is a direct bond (when b=2), a substituted or unsubstituted $C_1$-$C_{20}$ alkyl group, a substituted or unsubstituted $C_6$-$C_{20}$ aryl group, a substituted or unsubstituted $C_2$-$C_{20}$ heteroaryl group, O, S, S═O, O═S═O or C═O. Substituents include, but are not limited to, hydroxy, a $C_1$-$C_{20}$ alkyl group, a $C_2$-$C_{10}$ alkoxy group, mercapto, a $C_3$-$C_8$ cycloalkyl group, a $C_6$-$C_{14}$ heterocyclic group, a $C_6$-$C_{14}$ aryl group, a $C_6$-$C_{14}$ heteroaryl group, halogen, cyano, nitro, nitrone, amino, amido, acyl, oxyacyl, carboxyl, carbamate, sulfonyl, sulfonamide, and sulfuryl.

In a particular embodiment within formula (1), the benzoxazine may be represented by the following formula (1a)

(1a)

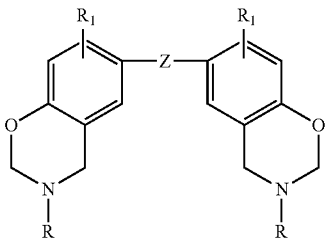

where Z is selected from a direct bond, $CH_2$, $C(CH_3)_2$, C═O, O, S, S═O, O═S═O and

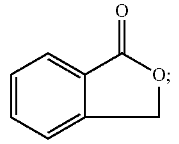

each R is independently hydrogen, a $C_1$-$C_{20}$ alkyl group, an allyl group, or a $C_6$-$C_{14}$ aryl group; and $R_1$ is defined as above.

In another embodiment, the benzoxazine may be embraced by the following general formula (2)

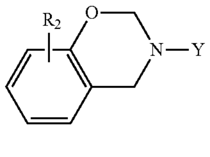

where Y is a $C_1$-$C_{20}$ alkyl group, a $C_2$-$C_{20}$ alkenyl group, or substituted or unsubstituted phenyl; and each $R_2$ is independently hydrogen, halogen, a $C_1$-$C_{20}$ alkyl group, a $C_2$-$C_{20}$ alkenyl group or a $C_6$-$C_{20}$ aryl group. Suitable substituents for phenyl are as set forth above.

In a particular embodiment within formula (2), the benzoxazine may be represented by the following formula (2a)

(2a)

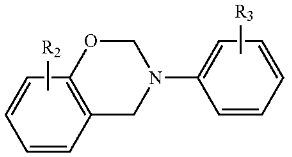

where each $R_2$ is independently a $C_1$-$C_{20}$ alkyl or $C_2$-$C_{20}$ alkenyl group, each of which being optionally substituted or interrupted by one or more O, N, S, C═O, COO and NHC═O, and a $C_6$-$C_{20}$ aryl group; and each $R_3$ is independently hydrogen, a $C_1$-$C_{20}$ alkyl or $C_2$-$C_{20}$ alkenyl group, each of which being optionally substituted or interrupted by one or more O, N, S, C═O, COOH and NHC═O or a $C_6$-$C_{20}$ aryl group.

Alternatively, the benzoxazine may be embraced by the following general formula (3)

(3)

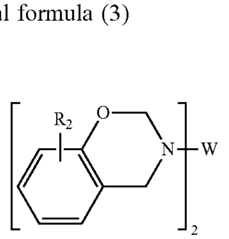

where p is 2; W is selected from biphenyl, diphenyl methane, diphenyl isopropane, diphenyl sulfide, diphenyl sulfoxide, diphenyl sulfone, and diphenyl ketone; and $R^1$ is defined as above.

The benzoxazines are commercially available from several sources including Huntsman Advanced Materials Americas LLC, Georgia Pacific Resins Inc. and Shikoku Chemicals Corporation.

The benzoxazines may also be obtained by reacting a phenol compound, for example, bisphenol A, bisphenol F or phenolphthalein, with an aldehyde, for example, formaldehyde, and a primary amine, under conditions in which water is removed. The molar ratio of phenol compound to aldehyde reactant may be from about 1:3 to 1:10, alternatively from about 1:4: to 1:7. In still another embodiment, the molar ratio of phenol compound to aldehyde reactant may be from about 1:4.5 to 1:5. The molar ratio of phenol compound to primary amine reactant may be from about 1:1 to 1:3, alternatively from about 1:1.4 to 1:2.5. In still another embodiment, the molar ratio of phenol compound to primary amine reactant may be from about 1:2.1 to 1:2.2.

Examples of primary amines include: aromatic mono- or di-amines, aliphatic amines, cycloaliphatic amines and heterocyclic monoamines, for example, aniline, o-, m- and p-phenylene diamine, benzidine, 4,4'-diaminodiphenyl methane, cyclohexylamine, butylamine, methylamine, hexylamine, allylamine, furfurylamine ethylenediamine, and propylenediamine. The amines may, in their respective carbon part, be substituted by $C_1$-$C_8$ alkyl or allyl. In one embodiment, the primary amine is a compound having the general formula $R_aNH_2$, wherein $R_a$ is allyl, unsubstituted or substituted phenyl, unsubstituted or substituted $C_1$-$C_8$ alkyl or unsubstituted or substituted $C_3$-$C_8$ cycloalkyl. Suitable substituents on the $R_a$ group include, but are not limited to, amino, $C_1$-$C_4$ alkyl and allyl. In some embodiments, one to four substituents may be present on the $R_a$ group. In one particular embodiment, $R_a$ is phenyl.

According to one embodiment, the benzoxazine may be present in the curable composition in an amount in the range of between about 10 wt. % to about 90 wt. %, based on the total weight of the curable composition. In another embodiment, the benzoxazine may be present in the curable composition in an amount in the range of between about 60 wt. % to about 90 wt. %, based on the total weight of the curable composition.

The curable resin composition also includes a toughener component comprising a multistage polymer and a thermoplastic toughener.

The multistage polymer (for e.g. as described in WO2016/102411 and WO2016/102682, the contents of which are incorporated herein by reference) has at least two stages that are different in its polymer composition where the first stage forms the core and the second or all following stages form the respective shells. The multistage polymer may be in the form of polymer particles, especially spherical particles. These polymer particles are also called core shell particles with the first stage forming the core and the second or all following stages forming the respective shells. In one embodiment, the polymer particles may have a weight average particle size between 20 nm and 800 nm, or between 25 nm and 600 nm, or between 30 nm and 550 nm or between 40 nm and 400 nm or between 75 nm and 350 nm or between 80 nm and 300 nm. The polymer particles may be agglomerated to provide a polymer powder.

Thus, the polymer particles may have a multilayer structure including at least one layer (or stage) (A) comprising a polymer (A1) having a glass transition temperature below about 10° C., and at least another layer (or stage) (B) comprising a polymer (B1) having a glass transition temperature over about 30° C. In some embodiments, the polymer (B1) is the external layer of the polymer particle. In other embodiments, the stage (A) comprising the polymer (A1) is the first stage and the stage (B) comprising the polymer (B1) is grafted on stage (A) comprising the polymer (A1).

As noted above, the polymer particle may be obtained by a multistage process such as a process comprising two, three or more stages. The polymer (A1) having a glass transition temperature below about 10° C. in the layer (A) is never made during the last stage of the multistage process. This means that the polymer (A1) is never in the external layer of the particle. Accordingly, the polymer (A1) having a glass transition temperature below about 10° C. in the layer (A) is either in the core of the polymer particle or one of the inner layers.

In some embodiments, the polymer (A1) having a glass transition temperature below about 10° C. in the layer (A) is made in the first stage of the multistage process forming the core for the polymer particle having the multilayer structure and/or before the polymer (B1).

In other embodiments, the polymer (B1) having a glass transition temperature above about 30° C. is made in the last stage of the multistage process forming the external layer of the polymer particle. There could be additional intermediate layer or layers obtained by an intermediate stage or intermediate stages.

In one embodiment, at least a part of the polymer (B1) of layer (B) is grafted on the polymer made in the previous layer. If there are only two stages (A) and (B) comprising polymer (A1) and (B1) respectively, a part of polymer (B1) is grafted on polymer (A1). In some embodiments, at least 50 wt. % of polymer (B1) is grafted.

According to one embodiment, the polymer (A1) is a (meth)acrylic polymer comprising at least 50 wt. % of monomers from alkyl acrylates. In further embodiments, the polymer (A1) comprises a comonomer or comonomers which are copolymerizable with alkyl acrylate, as long as polymer (A1) has a glass transition temperature of less than about 10° C. The comonomer or comonomers in polymer (A1) may be chosen from (meth)acrylic monomers and/or vinyl monomers. The (meth)acrylic comonomers may comprise monomers chosen from $C_1$ to $C_{12}$ alkyl (meth)acrylates. In still other embodiments, the (meth)acrylic comonomer in polymer (A1) includes monomers of $C_1$ to $C_4$ alkyl (meth)acrylate and/or $C_1$ to $C_8$ alkyl acrylate monomers. Most preferably, the acrylic or methacrylic comonomers of the polymer (A1) are chosen from methyl acrylate, propyl acrylate, isopropyl acrylate, butyl acrylate, tert-butyl acrylate, methyl methacrylate, ethyl methacrylate, butyl methacrylate and mixtures thereof, as long as polymer (A1) has a glass transition temperature of less than about 10° C.

In another embodiment, the polymer (A1) is crosslinked (i.e., a crosslinker is added to the other monomer or monomers). The crosslinker may comprise at least two groups that can be polymerized.

In one specific embodiment, the polymer (A1) is a homopolymer of butyl acrylate. In another specific embodiment, the polymer (A1) is a copolymer of butyl acrylate and at least one crosslinker. The crosslinker may be present in an amount of less than 5 wt. % of this copolymer.

In still another embodiment, the polymer (A1) having a glass transition temperature below about 10° C. is a silicone rubber based polymer. The silicone rubber may be, for example, polydimethylsiloxane.

In still another embodiment, the polymer (A1) having a glass transition temperature below about 10° C. comprises at least 50 wt. % of polymeric units coming from isoprene or butadiene and the stage (A) is the most inner layer of the polymer particle. In other words the stage (A) comprising the polymer (A1) is the core of the polymer particle. By way of example, the polymer (A1) of the core may be made of isoprene homopolymers or butadiene homopolymers, isoprene-butadiene copolymers, copolymers of isoprene with at most 98 wt. % of a vinyl monomer and copolymers of butadiene with at most 98 wt. % of a vinyl monomer. The vinyl monomer may be styrene, an alkylstyrene, acrylonitrile, an alkyl (meth) acrylate, or butadiene or isoprene. In one embodiment the core is a butadiene homopolymer.

The polymer (B1) may be made of homopolymers and copolymers comprising monomers with double bonds and/or vinyl monomers. Preferably, the polymer (B1) is a (meth) acrylic polymer. Preferably the polymer (B1) comprises at least 70 wt. % monomers chosen from $C_1$ to $C_{12}$ alkyl (meth)acrylates. Still more preferably, the polymer (B1) comprises at least 80 wt. % of monomers of $C_1$ to $C_4$ alkyl methacrylate and/or $C_1$ to $C_8$ alkyl acrylate monomers. Most preferably, the acrylic or methacrylic monomers of the polymer (B1) are chosen from methyl acrylate, ethyl acrylate, butyl acrylate, methyl methacrylate, ethyl methacrylate, butyl methacrylate and mixtures thereof, as long as polymer (B1) has a glass transition temperature of at least about 30° C. Advantageously, the polymer (B1) comprises at least 70 wt. % of monomer units coming from methyl methacrylate.

In another embodiment, the multistage polymer as described previously has an additional stage, which is a (meth)acrylic polymer (P1). The primary polymer particle according to this embodiment will have a multilayer structure comprising at least one stage (A) comprising a polymer (A1) having a glass transition temperature below about 10° C., at least one stage (B) comprising a polymer (B1) having a glass transition temperature over about 30° C. and at least one stage (P) comprising the (meth)acrylic polymer (P1) having a glass transition temperature between about 30° C. and about 150° C. Preferably, the (meth)acrylic polymer (P1) is not grafted on any of the polymers (A1) or (B1).

The (meth)acrylic polymer (P1) may have a mass average molecular weight Mw of less than about 100,000 g/mol, or less than about 90,000 g/mol, or less than about 80,000 g/mol, or less than about 70,000 g/mol, advantageously less than about 60,000 g/mol, more advantageously less than about 50,000 g/mol and still more advantageously less than about 40,000 g/mol.

The (meth)acrylic polymer (P1) may have a mass average molecular weight Mw above about 2000 g/mol, or above about 3000 g/mol, or above about 4000 g/mol, or above about 5000 g/mol, advantageously above about 6000 g/mol, more advantageously above about 6500 g/mol and still more advantageously above about 7000 g/mol and most advantageously above about 10,000 g/mol.

The mass average molecular weight Mw of (meth)acrylic polymer (P1) may be between about 2000 g/mol and about 100,000 g/mol, or between about 3000 g/mol and about 90,000 g/mol or between about 4000 g/mol and about 80,000 g/mol, advantageously between about 5000 g/mol and about 70,000 g/mol, more advantageously between about 6000 g/mol and about 50,000 g/mol and most advantageously between about 10,000 g/mol and about 40,000 g/mol.

Preferably, the (meth)acrylic polymer (P1) is a copolymer comprising (meth)acrylic monomers. More preferably, the (meth)acrylic polymer (P1) is a (meth)acrylic polymer. Still more preferably, the (meth)acrylic polymer (P1) comprises at least 50 wt. % monomers chosen from $C_1$ to $C_{12}$ alkyl (meth)acrylates. Advantageously the (meth)acrylic polymer (P1) comprises at least 50 wt. % of monomers chosen from $C_1$ to $C_4$ alkyl methacrylate and $C_1$ to $C_8$ alkyl acrylate monomers and mixtures thereof. More advantageously the (meth)acrylic polymer (P1) comprises at least 50 wt. % of polymerized methyl methacrylate, and even more advantageously at least 60 wt. % and most advantageously at least 65 wt. % of polymerized methyl methacrylate.

In one embodiment the (meth)acrylic polymer (P1) comprises from 50 wt. % to 100 wt. % methyl methacrylate, or from 80 wt. % to 100 wt. % methyl methacrylate, or from 80 wt. % to 99.8 wt. % methyl methacrylate and from 0.2 wt. % to 20 wt. % of a $C_1$ to $C_8$ alkyl acrylate monomer. Advantageously the $C_1$ to $C_8$ alkyl acrylate monomer is chosen from methyl acrylate, ethyl acrylate or butyl acrylate.

In another embodiment the (meth)acrylic polymer (P1) comprises between 0.01 wt. % and 50 wt. % of a functional monomer. Preferably, the (meth)acrylic polymer (P1) comprises between 0.01 wt. % and 30 wt. % of the functional monomer, more preferably between 1 wt. % and 30 wt. %, still more preferably between 2 wt. % and 30 wt. %, advantageously between 3 wt. % and 30 wt. %, of the functional monomer.

In one embodiment, the functional monomer is chosen from glycidyl (meth)acrylate, acrylic or methacrylic acid, amides derived from acrylic or methacrylic acids, such as, for example, dimethylacrylamide, 2-methoxyethyl acrylate or methacrylate, 2-aminoethyl acrylates or methacrylates which are optionally quaternized, acrylate or methacrylate monomers comprising a phosphonate or phosphate group, alkyl imidazolidinone (meth)acrylates and polyethylene glycol (meth)acrylates. Preferably, the polyethylene glycol group of the polyethylene glycol (meth)acrylates have a molecular weight ranging from 400 g/mol to 10,000 g/mol.

In one embodiment, toughener component also includes a thermoplastic toughener. In one embodiment, the thermoplastic toughener is a polyethersulfone. Non-limiting examples of polyethersulfones include particulate polyethersulfones sold under the brand name Sumnikaexcel® polyethersulfones which are commercially available from Sumitomo Chemicals, and those sold under the brand names Veradel® and Virantage® polyethersulfones which are commercially available from Solvay Chemicals. Densified polyethersulfone particles may also be used. The form of the polyethersulfone is not particularly important since the polyethersulfone can be dissolved during formation of the curable resin composition. Densified polyethersulfone particles can be made in accordance with the teachings of U.S. Pat. No. 4,945,154, the contents of which are hereby incorporated by reference. Densified polyethersulfone particles are also available commercially from Hexcel Corporation under the brand name HRI-1. In some embodiments, the average particle size of the polyethersulfone is less than 100 microns to promote and ensure complete dissolution of the polyethersulfone in the thermoset resin.

In another embodiment, the thermoplastic toughener may be any of the following thermoplastic polymers: polysulfone, polyetherimide, polyamide (PA), poly(phenylene) oxide (PPO), poly(ethylene oxide) (PEO), phenoxy, poly (methyl methacrylate) (PMMA), poly(vinylpyrrolidone) (PVP), poly(ether ether ketone) (PEEK), poly(styrene) (PS), polycarbonate (PC) or mixtures thereof. According to one embodiment, the polyethersulfone is the sole thermoplastic toughener included in the curable resin composition (i.e. the curable resin composition does not include any other thermoplastic polymer toughening agents other than polyethersulfone).

According to one embodiment, the amount of the toughener component present in the curable resin composition is less than about 25 wt. %, based on the total weight of the curable resin composition. In another embodiment, the amount of the toughener component present in the curable resin composition is less than about 22.5 wt. %, or less than about 20 wt. %, or less than about 17.5 wt. % or less than about 15 wt. %, based on the total weight of the curable resin composition. According to another embodiment, the amount of the toughener component present in the curable resin composition is at least about 1 wt. %, or at least about 5 wt. % or at least about 7.5 wt. %, based on the total weight of the curable resin composition. In still another embodiment the amount of the toughener component present in the curable resin composition is between about 1 wt. % to about 25 wt. %, or between about 5 wt. % to about 20 wt. % or between about 7 wt. % to about 16 wt. %, based on the total weight of the curable resin composition. In another embodiment, the amount of the toughener component present in the curable resin composition is between about 1 wt. % to about 15 wt. %, based on the total weight of the curable resin composition.

According to another embodiment, the amount of multi-stage polymer present in the curable resin composition is between about 3 wt. % to about 20 wt. %, or between about 4 wt. % to about 15 wt. %, or between about 5 wt. % to about 10 wt. %, based on the total weight of the curable resin composition. In still another embodiment, the amount of the thermoplastic toughener present in the curable resin mixture is between about 0.1 wt. % to about 10 wt. %, or between about 0.5 wt. % to about 8 wt. %, or between about 1 wt. % to about 7 wt. %, based on the total weight of the curable resin composition.

Hardening of the curable resin composition may be accomplished by the addition of a phenylindane diamine. In one embodiment, the phenylindane diamine is a compound having a structure

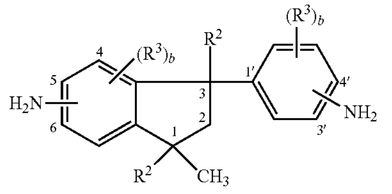

where $R^2$ is hydrogen or an alkyl group having from 1 to 6 carbon atoms; $R^3$ is independently hydrogen, halogen or an alkyl group having from 1 to 6 carbon atoms; and b is independently an integer of 1 to 4 and the amino group on the indane ring is at the 5 or 6 position.

The phenylindane diamines can comprise any combination of the isomeric or substituted isomeric phenylindane diamine compounds. For example, the phenylindane diamines can comprise from 0 mole % to 100 mole % of 5-amino-3-(4'-aminophenyl)-1,1,3-trimethylindane in combination with from 100 mole % to 0 mole % of 6-amino-3-(4'-aminophenyl)-1,1,3-trimethylindane. Further, either or both of these isomers can be substituted over the entire range from 0 to 100% by any of the substituted diamine isomers. Examples of such substituted diamine isomers are 5-amino-6-methyl-3-(3'-amino-4'-methylphenyl)-1,1,3-trimethylindane, 5-amino-3-(4'-amino-Ar',Ar'-dichlorophenyl)-Ar,Ar-dichloro-1,1,3-trimethylindane, 6-amino-(4'-amino-Ar',Ar'-dichloro-phenyl)-Ar,Ar-dichloro-1,1,3-trimethylindane, 4-amino-6-methyl-3 (3'-amino-4'-methyl-phenyl)-1,1,3-trimethylindane and Ar-amino-3-(Ar'-amino-2',4'-dimethylphenyl)-1,1,3,4,6-pentamethylindane. The prefixes Ar and Ar' in the above formulae indicate indefinite positions for the given substituents in the phenyl rings.

Among the phenylindane diamines, there can be mentioned those in which $R^2$ independently is hydrogen or methyl, and $R^3$ independently is hydrogen, methyl, chloro or bromo. In particular, suitable phenylindane diamines are those in which $R^2$ is hydrogen or methyl, and $R^3$ independently is hydrogen, methyl, chloro or bromo, and the amino groups are at positions 5 or 6 and at positions 3' or 4'. Because of relative availability, the phenylindane diamines which are particularly suitable include compounds wherein $R^2$ is methyl, each $R^3$ is hydrogen, and the amino groups are at positions 5 or 6 and at position 4'. These compounds are known as 5(6)-amino-3-(4'-aminophenyl)-1,1,3-trimethylindane (DAPI).

The phenylindane diamines and methods for their preparation are disclosed in U.S. Pat. Nos. 3,856,752 and 3,983,092, which patents are fully incorporated by reference herein with respect to their disclosures pertaining to the preparation of such materials.

In addition to the phenylindane diamine, other hardeners may also be included such as, but limited to aromatic amines, cyclic amines, aliphatic amines, alkyl amines, polyether amines, including those polyether amines that can be derived from polypropylene oxide and/or polyethylene oxide, 9,9-bis(4-amino-3-chlorophenyl)fluorene (CAF), acid anhydrides, carboxylic acid amides, polyamides, polyphenols, cresol and phenol novolac resins, imidazoles, guanidines, substituted guanidines, substituted ureas, melamine resins, guanamine derivatives, tertiary amines, Lewis acid complexes, such as boron trifluoride and boron trichloride and polymercaptans. Any epoxy-modified amine products, Mannich modified products, and Michael modified addition products of the hardeners described above may also be used. All of the above mentioned curatives may be used either alone or in any combination.

Exemplary aromatic amines include, but are not limited to 1,8 diaminonaphthalene, m-phenylenediamine, diethylene toluene diamine, diaminodiphenylsulfone, diaminodiphenylmethane, diaminodiethyldimethyl diphenylmethane, 4,4'-methylenebis(2,6-diethylaniline), 4,4'-methylenebis(2-isopropyl-6-methylaniline), 4,4'-methylenebis(2,6-diisopropylaniline), 4,4'-[1,4-phenylenebis(1-methyl-ethylindene)] bisaniline, 4,4'-[1,3-phenylenebis(1-methyl-ethylindene)] bisaniline, 1,3-bis(3-aminophenoxy)benzene, bis-[4-(3-aminophenoxy)phenyl]sulfone, bis-[4-(4-aminophenoxy) phenyl]sulfone, 2,2'-bis[4-(4-aminophenoxy)phenyl] propane and bis(4-amino-2-chloro-3,5-diethylphenyl) methane. Furthermore, the aromatic amines may include heterocyclic multifunctional amine adducts as disclosed in U.S. Pat. Nos. 4,427,802 and 4,599,413, which are both hereby incorporated by way of reference in their entirety.

Examples of cyclic amines include, but are not limited to bis(4-amino-3-methyldicyclohexyl)methane, diaminodicyclohexylmethane, bis(aminomethyl)cyclohexane, N-aminoethylpyrazine, 3,9-bis(3-aminopropyl)-2,4,8,10-tetraoxaspiro(5,5)undecane, m-xylenediamine, isophoronediamine, menthenediamine, 1,4-bis(2-amino-2-methylpropyl) piperazine, N,N'-dimethylpiperazine, pyridine, picoline, 1,8-diazabicyclo[5,4,0]-7-undecene, benzylmethylamine, 2-(dimethylaminomethyl)-phenol, 2-methylimidazole, 2-phenylimidazole, and 2-ethyl-4-methylimidazole.

Exemplary aliphatic amines include, but are not limited to diethylenetriamine, triethylenetetramine, tetraethylenepentamine, 3-(dimethylamino)propylamine, 3-(diethylamino)-propylamine, 3-(methylamino)propylamine, tris(2-aminoethyl)amine; 3-(2-ethylhexyloxy)propylamine, 3-ethoxypropylamine, 3-methoxypropylamine, 3-(dibutylamino)propylamine, and tetramethyl-ethylenediamine; ethylenediamine; 3,3'-iminobis(propylamine), N-methyl-3,3'- iminobis(propylamine); allylamine, diallylamine, triallylamine, polyoxypropylenediamine, and polyoxypropylenetriamine.

Exemplary alkyl amines include, but are not limited to methylamine, ethylamine, propylamine, isopropylamine, butylamine, sec-butylamine, t-butylamine, n-octylamine, 2-ethylhexylamine, dimethylamine, diethylamine, dipropylamine, diisopropylamine, dibutylamine, di-sec-butylamine, di-t-butylamine, di-n-octylamine and di-2-ethylhexylamine.

Exemplary acid anhydrides include, but are not limited to, cyclohexane-1,2-dicarboxylic acid anhydride, 1-cyclohexene-1,2-dicarboxylic acid anhydride, 2-cyclohexene-1,2-dicarboxylic acid anhydride, 3-cyclohexene-1,2-dicarboxylic acid anhydride, 4-cyclohexene-1,2-dicarboxylic acid anhydride, 1-methyl-2-cyclohexene-1,2-dicarboxylic acid anhydride, 1-methyl-4-cyclohexene-1,2-dicarboxylic acid anhydride, 3-methyl-4-cyclohexene-1,2-dicarboxylic acid anhydride, 4-methyl-4-cyclohexene-1,2-dicarboxylic acid anhydride, dodecenylsuccinic anhydride, succinic anhydride, 4-methyl-1-cyclohexene-1,2-dicarboxylic acid anhydride, phthalic anhydride, hexahydrophthalic anhydride, nadic methyl anhydride, dodecenylsuccinic anhydride, tetrahydrophthalic anhydride, maleic anhydride, pyromellitic dianhydride, trimellitic anhydride, benzophenonetetracarboxylic dianhydride, bicyclo[2.2.1]hept-5-ene-2,3-dicarboxylic anhydride, methylbicyclo[2.2.1]hept-5-ene-2,3-dicarboxylic anhydride, bicyclo[2.2.1]hept-5-ene-2,3-dicarboxylic anhydride, dichloromaleic anhydride, chlorendic anhydride, tetrachlorophthalic anhydride and any derivative or adduct thereof.

Exemplary imidazoles include, but are not limited to, imidazole, 1-methylimidazole, 2-methylimidazole, 2-ethylimidazole, 2-isopropylimidazole, 2-n-propylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-isopropyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 2-phenyl-4-methyl-5-hydroxymethylimidazole, 2-phenylimidazole, 2-phenyl-4,5-dihydroxymethylimidazole, 1,2-phenyl-4-methyl-5-hydroxymethylimidazole, 1-dodecyl-2-methylimidazole and 1-cyanoethyl-2-phenyl-4,5-di(2-cyanoethoxy)methylimidazole.

Exemplary substituted guanidines are methylguanidine, dimethylguanidine, trimethylguanidine, tetramethylguanidine, methylisobiguanidine, dimethylisobiguanidine, tetramethylisobiguanidine, hexamethylisobiguanidine, heptamethylisobiguanidine and cyanoguanidine (dicyandiamide). Representatives of guanamine derivatives which may be mentioned are alkylated benzoguanamine resins, benzoguanamine resins or methoxymethylethoxymethylbenzoguanamine. Substituted ureas may include p-chlorophenyl-N, N-dimethylurea (monuron), 3-phenyl-1, 1-dimethylurea (fenuron) or 3, 4-dichlorophenyl-N,N-dimethylurea (diuron).

Exemplary tertiary amines include, but are not limited to, trimethylamine, tripropylamine, triisopropylamine, tributylamine, tri-sec-butylamine, tri-t-butylamine, tri-n-octylamine, N,N-dimethylaniline, N,N-dimethyl-benzylamine, pyridine, N-methylpiperidine, N-methylmorpholine, N,N-dimethylaminopyridine, derivatives of morpholine such as bis(2-(2,6-dimethyl-4-morpholino)ethyl)-(2-(4-morpholino) ethyl)amine, bis(2-(2,6-dimethyl-4-morpholino)ethyl)-(2-(2,6-diethyl-4-morpholino)ethyl)amine, tris(2-(4-morpholino)ethyl)amine, and tris(2-(4-morpholino)propyl) amine, diazabicyclooctane (DABCO), and heterocyclic compounds having an amidine bonding such as diazabicyclono.

Amine-epoxy adducts are well-known in the art and are described, for example, in U.S. Pat. Nos. 3,756,984, 4,066,625, 4,268,656, 4,360,649, 4,542,202, 4,546,155, 5,134,239, 5,407,978, 5,543,486, 5,548,058, 5,430,112, 5,464,910, 5,439,977, 5,717,011, 5,733,954, 5,789,498, 5,798,399 and 5,801,218, each of which is incorporated herein by reference in its entirety. Such amine-epoxy adducts are the products of the reaction between one or more amine compounds and one or more epoxy compounds. Preferably, the adduct is a solid which is insoluble in the epoxy resin at room temperature, but which becomes soluble and functions as an accelerator to increase the cure rate upon heating. While any type of amine can be used (with heterocyclic amines and/or amines containing at least one secondary nitrogen atom being preferred), imidazole compounds are particularly preferred. Illustrative imidazoles include 2-methyl imidazole, 2,4-dimethyl imidazole, 2-ethyl-4-methyl imidazole, 2-phenyl imidazole and the like. Other suitable amines include, but are not limited to, piperazines, piperidines, pyrazoles, purines, and triazoles. Any kind of epoxy compound can be employed as the other starting material for the adduct, including mono-functional, and multi-functional epoxy compounds such as those described previously with regard to the epoxy resin component.

In one embodiment, the curable resin composition of the present disclosure may contain the phenylindane diamine hardener in an amount of between about 5 wt. % to about 50 wt. %, or between about 20 wt. % to about 50 wt. %, or between about 40 wt. % to about 50 wt. %, based on the total weight of the curable resin composition.

In yet another embodiment, the curable resin composition may also contain one or more other additives which are useful for their intended uses. For example, the optional additives useful may include, but are not limited to, diluents, stabilizers, surfactants, flow modifiers, release agents, matting agents, degassing agents, thermoplastic particles (for e.g. carboxyl terminated liquid butadiene acrylonitrile rubber (CTBN), acrylic terminated liquid butadiene acrylonitrile rubber (ATBN), epoxy terminated liquid butadiene acrylonitrile rubber (ETBN), liquid epoxy resin (LER) adducts of elastomers and preformed core-shell rubbers), curing initiators, curing inhibitors, wetting agents, processing aids, fluorescent compounds, UV stabilizers, antioxidants, impact modifiers, corrosion inhibitors, tackifiers, high density particulate fillers (for e.g. various naturally occurring clays, such as kaolin, bentonite, montmorillonite or modified montmorillonite, attapulgate and Buckminsterfuller's earth; other naturally occurring or naturally derived materials, such as mica, calcium carbonate and aluminum carbonate; various oxides, such as ferric oxide, titanium dioxide, calcium oxide and silicon dioxide (for e.g., sand); various man-made materials, such as precipitated calcium carbonate; and various waste materials such as crushed blast furnace slag), conducting particles (for e.g. silver, gold, copper, nickel, aluminum and conducting grades of carbon and carbon nanotubes) and mixtures thereof.

When present, the amount of additives included in the curable resin composition may be in an amount of at least about 0.5 wt. %, or at least 2 wt. %, or at least 5 wt. % or at least 10 wt. %, based on the total weight of the curable resin composition. In other embodiments, the amount of additives included in the curable resin composition may be no more than about 30 wt. %, or no more than 25 wt. %, or no more than 20 wt. % or no more than 15 wt. %, based on the total weight of the curable resin composition.

The curable resin composition may be prepared, for example, by premixing individual components and then mixing these premixes, or by mixing all of the components together using customary devices, such as a stirred vessel, stirring rod, ball mill, sample mixer, static mixer, high shear mixer, ribbon blender or by hot melting.

Thus, according to another embodiment, the curable resin composition of the present disclosure may be prepared by mixing together from about 10 wt. % to about 95 wt. % of the thermoset resin and from about 1 wt. % to about 15 wt. % of the toughener component and from about 5 wt. % to about 50 wt. % of the hardener, where the wt. % is based on the total weight of the curable resin composition.

According to another embodiment, the curable resin composition may be applied to a substrate to coat at least a portion (or substantially all) of the substrate and then cured by heating at a temperature greater than about 80° C. to form a coated substrate. The curable resin composition may be applied by any known means, for example, spraying, dipping, fluidized bed, etc. In another embodiment, after application, the curable resin composition may be cured by heating at a temperature ranging from about 80° C. to about 180° C., preferably from about 100° C. to about 160° C. Heating can be affected by any means known in the art, such as by placing the coated substrate in an oven. IR radiation can also be used to heat cure the coated substrate. The powder coated surface should be exposed to curing temperatures for a period of time sufficient to cure the composition into a substantially continuous uniform coating. Typically, a curing time of from about 1 minute to about 10 minutes or more will convert the composition into a substantially continuous uniform coating. If desired, the curing may be conducted in two or more stages, for example, by partially curing at a lower temperature, then fully curing at an elevated temperature. In yet a further embodiment, the curable resin composition may achieve 85% full state cure within 5 minutes, preferably within 2 minutes, more preferably within 1 minute and most preferably within 45 seconds when cured at a temperature ranging between about 80° C. to about 160° C.

In another embodiment, the heat curable resin composition, upon mixing and curing, provides a film having a glass transition temperature greater than 150° C., preferably greater than 170° C., most preferably greater than 180° C., and especially preferably greater than 190° C.

The curable resin composition of the present disclosure may be used in a variety of applications, such as, casting, laminating, impregnating, coating, adhering, sealing, painting, binding, insulating, or in embedding, pressing, injection molding, extruding, sand mold binding, foam and ablative materials.

According to some embodiments, the heat curable resin composition may be used in the preparation of and/or as a sealant, adhesive or coating. The sealant, adhesive or coating comprising the curable resin composition may be applied to a surface (internal or external or both) of one or more substrates and subjected to heat to form a hardened film. The substrate may be metallic or non-metallic. Examples of substrates include metallic piping. for example those used in the transport of various chemistries such as those common in the chemical and oil and gas industries, silicate, metal oxide, concrete, wood, plastic, cardboard, particleboard, ceramics, glass, graphite, cellulosic materials, electronic chip materials, and semiconductor materials. In some embodiments, the substrates including the internal and/or external surfaces of steel pipes, structural steel used in concrete or in marine environments, storage tanks, valves and oil and gas production tubing and casings. If desired, prior to or subsequent of application of the curable resin composition, the surface of the substrate may be subjected to a mechanical treatment, such as blasting followed by, in case of metal substrates, acid rinsing, or cleaning followed by chemical treatment. In addition, the substrate to be coated may be pre-heated before the application of the powder composition.

In embodiments where the curable resin composition is used as a coating, it may be used in a one-coating system or as a coating layer in a multi-layer film build. The curable resin composition according to this disclosure can be applied directly on the substrate surface or on a layer of a primer which can be a liquid or a powder based primer. The curable resin composition according to this disclosure can also be applied as a coating layer of a multilayer coating system based on liquid or powder coats, for example, based on a powder or liquid clear coat layer applied onto a color-imparting and/or special effect-imparting base coat layer or a pigmented one-layer powder or liquid top coat applied onto a prior coating. The curable resin composition may be applied to the substrate by known means, such as by spraying, dipping, spreading, rolling, etc., in a single sweep or in several passes. After application, the coating applied onto the surface of the substrate is then heated at a temperature sufficient to cure the composition and form a film-coated substrate. In some embodiments, the film coating will generally have a thickness after cure of about 1 to 10 mils, preferably about 2-4 mils.

In another embodiment of this disclosure, the curable resin composition may be used as an adhesive for gluing or adhering parts made of the same or different substrates to form an article. The curable resin composition is first placed in contact with at least one of two or more of the same or different substrates to be bonded. In one embodiment, the curable resin composition is sandwiched between a first and second substrate. The curable resin composition and substrates are then heated at a temperature greater than 80° C. By applying heat, an adhesive bond is formed so as to adhere the substrates together and form the article.

Although making and using various embodiments of the present disclosure have been described in detail above, it should be appreciated that the present disclosure provides many applicable inventive concepts that can be embodied in a wide variety of specific contexts. The specific embodiments discussed herein are merely illustrative of specific ways to make and use the invention, and do not delimit the scope of the invention.

EXAMPLES

An exemplary resin formulation was prepared using ingredients listed for "Ex. 1" in Table 1. The formulation was prepared by blending an epoxy resin (Araldite® MY 0510 available from Huntsman International LLC or an affiliate thereof) and a methylmethacrylate-butadiene-styrene ("MB S") core-shell additive powder (Clearstrength®

XT 100 commercially available from Arkema) at 50° C. Then, the a polyethersulfone toughener (Virantage® VW-10200 RFP commercially available from Solvay Specialty Polymers USA, LLC) was added and heated up to 120° C. to dissolve the polyethersulfone toughener completely. Then DAPI was added at 80° C. and mixed.

The formulation for Ex. 1 was then cured for 3 hours at 160° C. and post-cured for 1 hour at 200° C. The cured sample was then subjected to elevated temperature aging in circulating air ovens at 150° C. and 170° C. and then tested for change in Tg by DMA using ASTM-D4055 as well as flexibility strain and strength using ASTM-D790 over a period of 35 to 42 days.

Comparative examples 1-3 (Comp. 1, Comp. 2, & Comp. 3) were prepared, cured, and evaluated in the same manner as Ex. 1 described above, but with different formulations as set forth in Table 1. In particular, the composition for Comp. 1 did not have the MBS Core-shell additive or the polyethersulfone toughener, the composition for Comp. 2 had the MBS Core-shell additive but not the polyethersulfone toughener, and Comp. 3 has the polyethersulfone toughener but not the MBS Core-shell additive.

The test data for Ex. 1 and Comps. 1-3 are set forth in Tables 2-4 below.

TABLE 1

| Component | Comp. 1 (wt %) | Comp. 2 (wt %) | Comp. 3 (wt %) | Ex. 1 (wt %) |
|---|---|---|---|---|
| DAPI | 39.7 | 37.67 | 41.06 | 38.83 |
| ARALDITE ® MY0510 epoxy resin | 60.30 | 56.65 | 56.13 | 55.61 |
| Clearstrength ® XT 100 XT-100 MBS Core-shell additive | | 5.67 | | 4.45 |
| Virantage ® VW-10200 RFP polyethersulfone | | | 2.81 | 1.12 |
| Total | 100 | 110 | 105 | 110 |

TABLE 2

| | Tg retention % at 150° C. | | | | Tg retention % at 170° C. | | | |
|---|---|---|---|---|---|---|---|---|
| Time, day | Comp. 1 | Comp. 2 | Comp. 3 | Ex. 1 | Comp. 1 | Comp. 2 | Comp. 3 | Ex. 1 |
| 0 | 100 | 100 | 100 | 100 | 100 | 100 | 100 | 100 |
| 3 | 101.16 | 100 | 99.62 | 99.62 | 96.90 | 91.60 | 95.82 | 96.20 |
| 7 | 99.22 | 97.71 | 98.48 | 99.24 | 92.64 | 90.08 | 92.02 | 91.25 |
| 14 | 96.90 | 93.89 | 96.20 | 97.34 | 86.82 | 84.73 | 85.55 | 87.07 |
| 21 | 95.35 | 93.89 | 94.30 | 94.68 | 84.50 | 83.21 | 83.65 | 84.41 |
| 28 | 95.35 | 93.89 | 92.78 | 94.68 | 84.50 | 83.21 | 83.65 | 84.41 |
| 35 | 94.19 | 92.75 | 92.78 | 93.16 | 84.50 | 83.21 | 83.65 | 84.41 |
| 42 | 92.64 | 90.46 | 92.78 | 93.16 | 84.50 | 83.21 | 83.65 | 84.41 |

TABLE 3

| | Flexural strain, % @ 170° C. | | | | Flexural strength % @170° C. | | | |
|---|---|---|---|---|---|---|---|---|
| Time, day | Comp. 1 | Comp. 2 | Comp. 3 | Ex. 1 | Comp. 1 | Comp. 2 | Comp. 3 | Ex. 1 |
| 0 | 5.98 | 5.5 | 5.85 | 7.12 | 19700 | 16700 | 19500 | 19330 |
| 7 | 1.50 | 2.31 | 1.64 | 2.87 | 6910 | 10190 | 7380 | 11460 |
| 14 | 1.20 | 1.50 | 1.20 | 1.60 | 6182 | 6804 | 5699 | 7660 |
| 21 | 1.10 | 1.30 | 1.10 | 1.60 | 5637 | 6177 | 5524 | 7130 |
| 35 | 1.40 | 1.60 | 1.40 | 1.60 | 5580 | 6210 | 5790 | 6430 |

Results in Tables 2 and 3 show a clear unexpected synergistic benefit when a polyethersulfone toughener is used in combination with the core-shell additive. As demonstrated by Comparative Examples 2 and 3, a person of ordinary skill in the art would have expected the combination of polyethersulfone toughener and core-shell additive to decrease the Tg value of a system only having the polyethersulfone toughener (Comp. 3). However, Ex. 1 shows that the combination unexpectedly has a higher Tg than Comp. 3 and Comp. 2. The same unexpectedly improved properties are demonstrated in Table 3, which shows that the combination of the polyethersulfone toughener and core-shell additive have a significantly increased flexural strength over either Comps. 2 and 3 by themselves as the cured samples are aged at 170° C. A person of ordinary skill in the art would expect similar benefits for the various embodiments of the curable resin composition disclosed herein.

What is claimed is:

1. A curable resin composition comprising (a) 20 wt. % to 75 wt. % of an thermoset resin, (b) 3 wt. % to 20 wt. % of a toughener component comprising a multistage polymer comprising a core and shell configuration and 0.1 wt. % to 10 wt. % of a thermoplastic toughener, and (c) 5 wt. % to 50 wt. % of a phenylindane diamine hardener; wherein the core and shell of the toughener component are composed of different polymers, the thermoplastic toughener is polyethersulfone, and the resin composition exhibits improved glass transition temperature retention at temperatures greater than 150° C. upon curing.

2. The composition of claim 1, wherein the thermoset resin is an epoxy resin.

3. The composition of claim 2, wherein the epoxy resin is selected from a monofunctional epoxy resin, a difunctional epoxy resin, a trifunctional epoxy resin, a tetrafunctional epoxy resin and a mixture thereof.

4. The composition of claim 1, wherein the composition further comprises 4,4'-methylene-bis-(3-chloro-2,6-diethylaniline).

5. The composition of claim 1, wherein the phenylindane diamine hardener is a compound having the structure

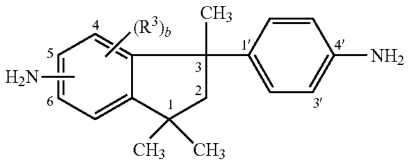

where the amino group on the indane ring is at the 5 or 6 position, $R^3$ is independently hydrogen, halogen or an alkyl group having from 1 to 6 carbon atoms and b is independently an integer of 1 to 4.

6. A curable resin composition comprising (a) about 50 wt. % to about 95 wt. % of a thermoset resin, (b) about 3 wt. % to about 20 wt. % of a toughener component comprising a multistage polymer comprising a core and shell configuration and 0.1 wt. % to 10 wt. % of a thermoplastic toughener, and (c) about 5 wt. % to about 50 wt. % of a phenylindane diamine hardener, where the wt. % is based on the total weight of the curable resin composition; wherein the core and shell of the toughener component are composed of different polymers, and wherein the thermoplastic toughener is polyethersulfone and the resin composition exhibits improved glass transition temperature retention at temperatures greater than 150° C. upon curing.

7. The composition of claim 6, wherein the toughener component comprises about 5 wt. % to about 10 wt. % of the multistage polymer and about 0.1 wt. % to about 10 wt. % of the thermoplastic toughener.

8. The composition of claim 6, wherein the phenylindane diamine hardener is a compound having the structure

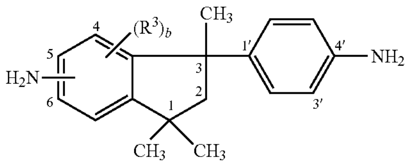

where the amino group on the indane ring is at the 5 or 6 position, $R^3$ is independently hydrogen, halogen or an alkyl group having from 1 to 6 carbon atoms and b is independently an integer of 1 to 4.

9. A substrate at least partially coated with the curable resin composition of claim 1.

10. The substrate of claim 9, wherein the substrate is metallic piping.

11. The substrate of claim 9, wherein the substrate is non-metallic.

12. The substrate of claim 9, wherein the substrate is a steel pipe, structural steel, a storage tank, a valve or an oil or gas production tubing or casing.

13. A process for forming a coated substrate comprising the steps of:

(a) applying the curable resin composition of claim 1 to a surface of a substrate; and (b) heating the curable resin composition at a temperature greater than 80° C. to cure the curable resin composition.

14. The process of claim 13, wherein the substrate is a metallic pipe.

15. The process of claim 13, wherein the surface is an external surface of the substrate.

16. The process of claim 13, wherein the surface is an internal surface of the substrate.

* * * * *